(12) United States Patent
Yamazaki et al.

(10) Patent No.: US 8,393,085 B2
(45) Date of Patent: Mar. 12, 2013

(54) DEVICE AND METHOD FOR CONTROLLING DEFLECTION OF LAMP

(75) Inventors: Masashi Yamazaki, Shizuoka (JP); Kazuo Goto, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 777 days.

(21) Appl. No.: 12/565,934

(22) Filed: Sep. 24, 2009

(65) Prior Publication Data

US 2010/0080009 A1    Apr. 1, 2010

(30) Foreign Application Priority Data

Sep. 26, 2008    (JP) ................... 2008-247906

(51) Int. Cl.
*G01B 7/30*    (2006.01)
(52) U.S. Cl. .......................................... 33/288; 362/465
(58) Field of Classification Search .................... 33/286, 33/288, 600; 362/40, 43, 460, 464, 465
See application file for complete search history.

(56) References Cited

U.S. PATENT DOCUMENTS

| | | | | |
|---|---|---|---|---|
| 2,314,559 A | * | 3/1943 | Schilling | 33/228 |
| 3,908,283 A | * | 9/1975 | Irwin | 33/288 |
| 5,343,372 A | * | 8/1994 | Shirai et al. | 33/288 |
| 5,506,759 A | * | 4/1996 | Shirai et al. | 33/288 |
| 5,697,161 A | * | 12/1997 | Denley | 33/288 |
| 5,833,346 A | * | 11/1998 | Denley | 33/288 |
| 6,363,619 B1 | * | 4/2002 | Schirmer et al. | 33/288 |
| 7,313,870 B2 | * | 1/2008 | Jeon | 33/288 |
| 2001/0008446 A1 | * | 7/2001 | Hopfenmuller | 33/288 |
| 2007/0089308 A1 | * | 4/2007 | Jeon | 33/288 |

FOREIGN PATENT DOCUMENTS

| | | |
|---|---|---|
| JP | 04-100744 | 4/1992 |
| JP | 2005-29080 | 2/2005 |
| JP | 2005-112296 | 4/2005 |
| JP | 2008-062663 | 3/2008 |

OTHER PUBLICATIONS

Japanese Patent Office, official communication in application No. 2008-247906 (Nov. 13, 2012).

* cited by examiner

*Primary Examiner* — G. Bradley Bennett
(74) *Attorney, Agent, or Firm* — Fish & Richardson P.C.

(57) ABSTRACT

Controlling a deflection of an irradiation direction of a vehicle lamp based on a detected steering angle includes calculating a target angle of the irradiation direction of the vehicle lamp based on the steering angle and calculating a difference angle between the target angle and a current deflection angle of the irradiation direction of the vehicle lamp. A new deflection angle is calculated and includes setting the new deflection angle to the target angle if the difference angle is equal to or smaller than a given limit angle, and setting the new deflection angle to an angle obtained by adding or subtracting the limit angle to or from the current deflection angle if the difference angle is larger than the given limit angle. Deflection of the irradiation direction of the lamp is controlled based on the deflection angle.

16 Claims, 9 Drawing Sheets

LOW SPEED

MEDIUM SPEED

HIGH SPEED

DEVICE AND METHOD FOR CONTROLLING DEFLECTION OF LAMP

CROSS-REFERENCE TO RELATED APPLICATION(S)

This application claims priority from Japanese Patent Application No. 2008-247906, filed on Sep. 26, 2008, the entire contents of which are incorporated herein by reference.

TECHNICAL FIELD

The present disclosure relates to controlling the deflection of a lamp using an AFS (Adaptive Front-lighting System). The AFS controls the deflection of the irradiation direction of headlamps of a vehicle such as an automobile in response to the change in the steering angle of the vehicle.

BACKGROUND

In order to improve safety when driving a vehicle, there has been proposed an AFS that controls the deflection of the irradiation direction of a headlamp in a cornering direction in response to the change in the steering angle of a steering wheel. According to this system, it is possible to make the irradiation direction of the headlamp face not only straight ahead but also in a direction where a driver steers the vehicle (i.e., a direction in which the vehicle is traveling). Therefore, this system is effective in improving safety in driving. Further, in recent years, as disclosed in JP-A-2005-29080, there has been proposed a device for controlling the deflection of a lamp. This device detects not only a steering angle but also detects the vehicle speed and controls the speed, responsiveness, and the like, at the time when the deflection of the irradiation direction of the headlamp is controlled, based on the vehicle speed and the steering angle. Accordingly, this device enables a headlamp to follow the change of conditions of a road on which the vehicle travels, and prevents a driver from feeling a sense of uneasiness.

In the device for controlling the deflection of a lamp using the AFS, an electric motor driven by an in-vehicle power source, such as an inexpensive stepping motor, has been used as a drive source. However, since the stepping motor easily controls a rotation angle but has a limitation on the maximum rotational speed, much time is required to change the irradiation direction of a lamp to a position that corresponds to a target deflection angle. For this reason, there is room for improvement in terms of the responsiveness of deflection control. Further, there are also problems in that rotation is not necessarily smooth, particularly the change of the irradiation range of a lamp is not smooth during the low-speed rotation. Accordingly, the employment of a DC brushless motor has been examined in recent years, instead of the stepping motor. The DC brushless motor has high maximum rotational speed and smooth rotation, and thus the DC brushless motor can quickly change the irradiation direction of the lamp to a position that corresponds to a target deflection angle. In addition, the DC brushless motor can smoothly change the irradiation range of the lamp as the deflection is controlled.

However, when the DC brushless motor is actually used for controlling the deflection of the irradiation direction of a lamp, the rotation characteristic of the DC brushless motor causes a problem in the deflection control. For example, in FIG. 9, the horizontal axis represents time, the vertical axis represents a steering angle and a deflection angle (referred to as a swivel deflection angle) of the irradiation direction of a headlamp, the dashed line shows a steering angle, and the thick solid line shows a swivel target angle that is a target value when a swivel deflection angle is controlled in response to the change in the steering angle. When the DC brushless motor is driven based on the swivel target angle in order to control the deflection of the headlamp, a difference angle between the swivel target angle and the actual swivel deflection angle at the time of control is calculated. The swivel deflection angle is set such that the difference angle is decreased, and the rotation of the DC brushless motor is controlled such that the irradiation direction of the lamp corresponds to the swivel target angle. Further, when the difference angle is decreased to a given angle and the swivel deflection angle thus is close to the swivel target angle, the rotation of the DC brushless motor is braked. Thus, control is performed such that the swivel deflection angle converges to the swivel target angle.

In the foregoing control, preferably the swivel deflection angle conforms to the swivel target angle. However, in fact, it is difficult to make the swivel deflection angle conform to the swivel target angle due to the rotation characteristic where the DC brushless motor can be driven at a high speed. Rotational speed is not constant and has an S-shaped characteristic as shown by a broken line in FIG. 9. That is, a slight delay occurs during the rising edge at the beginning of the rotation, and a suddenly accelerating operation is performed in order to compensate for the delay during the rising edge, so that the rotational speed becomes high. In addition, when the swivel deflection angle approaches the swivel target angle, sudden braking is performed so that the swivel deflection angle corresponds to the swivel target angle. For this reason, as for the actual swivel control, the deflection control where the irradiation direction is moved at a low speed is performed at the beginning of the deflection control, the deflection control where the irradiation direction is moved at a very high speed is performed thereafter, and the deflection control where the irradiation direction is rapidly decelerated is performed at the end of the deflection control. Therefore, the control where the moving speed of the irradiation direction is not stable is performed as a whole, so that a driver feels a sense of uneasiness. This is the same even in the case where the swivel deflection angle of the headlamp returns to the straight ahead direction as shown in FIG. 9. Further, this is not limited to the DC brushless motor, and is the same even in the case of using a motor capable of rotating at a high speed like the DC brushless motor.

SUMMARY

Some implementations of the invention address one or more of the problems discussed above. However, it should be understood that some implementations may not address any of the foregoing problems, although they may, in some cases, address other problems not expressly discussed above.

Accordingly, it is an aspect of the present invention to provide a device and method for controlling the deflection of a lamp that suppresses the high-speed rotation of a motor at the time of deflection control and controls the deflection of an irradiation range of a lamp at a substantially constant and stable speed, so that a driver does not feel a sense of uneasiness.

The disclosure also describes a device that detects a steering angle of a vehicle and controls a deflection of an irradiation direction of a vehicle lamp based on the detected steering angle In one aspect of the invention, controlling a deflection of an irradiation direction of a vehicle lamp based on a detected steering angle includes calculating a target angle of the irradiation direction of the vehicle lamp based on the steering angle and calculating a difference angle between the target angle and a current deflection angle of the irradiation direction of the vehicle lamp. A new deflection angle is calculated and includes setting the new deflection angle to the target angle if the difference angle is equal to or smaller than a given limit angle, and setting the new deflection angle to an angle obtained by adding or subtracting the limit angle to or from the current deflection angle if the difference angle is larger than the given limit angle. Deflection of the irradiation direction of the lamp is controlled based on the deflection angle.

Some implementations include one or more of the following features. For example, the limit angle can be set to a fixed preset value. In some cases, calculating the limit angle includes setting the limit angle to a first angle if the difference angle is equal to or larger than zero, and setting the limit angle to a second angle if the difference angle is smaller than zero. Preferably, the second angle is larger than the first angle.

In some implementations, calculating the limit angle includes setting the limit angle to a first angle if an absolute value of the detected steering angle is being increased, and setting the limit angle to a second angle if an absolute value of the detected steering angle is being decreased. Preferably, the second angle is larger than the first angle.

In some implementations, calculating the limit angle includes setting the limit angle to a first angle if the detected vehicle speed is in a first range of speed, setting the limit angle to a second angle if the detected vehicle speed is in a second range of speed, and setting the limit angle to a third angle if the detected vehicle speed is in a third range of speed. Preferably, the first range of speed is less than the second range of speed, and the second range of speed is less than the third range of speed. Also, preferably, the first angle is less than the second angle, and the second angle is less than the third angle.

Other aspects and advantages of the present invention will be apparent from the following description, the drawings and the claims.

DETAILED DESCRIPTION

According to an example implementation (for example, when a difference angle, which is obtained by subtracting a deflection angle from a target angle, has a negative value), a limit angle value is set to be larger as compared to the case where the difference angle has a positive value. When the difference angle has a negative value, steering operation is performed so that the vehicle travels from the cornering direction toward the straight ahead direction. Accordingly, if the limit angle is set to a large angle, it may be possible to increase the speed of the deflection control of a lamp when steering operation is returned such that the vehicle travels in the straight ahead direction, that is, when vehicle speed is generally increased. As a result, it may be possible to achieve appropriate control of the deflection of a lamp that better corresponds to traveling conditions of the vehicle.

Further, according to an example implementation, when the control does not involve increasing a steering angle in a cornering direction, a limit angle is set to a large value as compared to when the control is performed. If a limit angle is set to a large angle when the control is not performed, that is, when a steering operation is performed so that the vehicle travels from the cornering direction toward the straight ahead direction, it may be possible to increase the speed of the control of the deflection of a lamp when the steering returns such that the vehicle travels in the straight ahead direction where vehicle speed is generally increased and to achieve appropriate control of the deflection of a lamp that corresponds to running conditions of a vehicle.

First Embodiment

Figure 1:
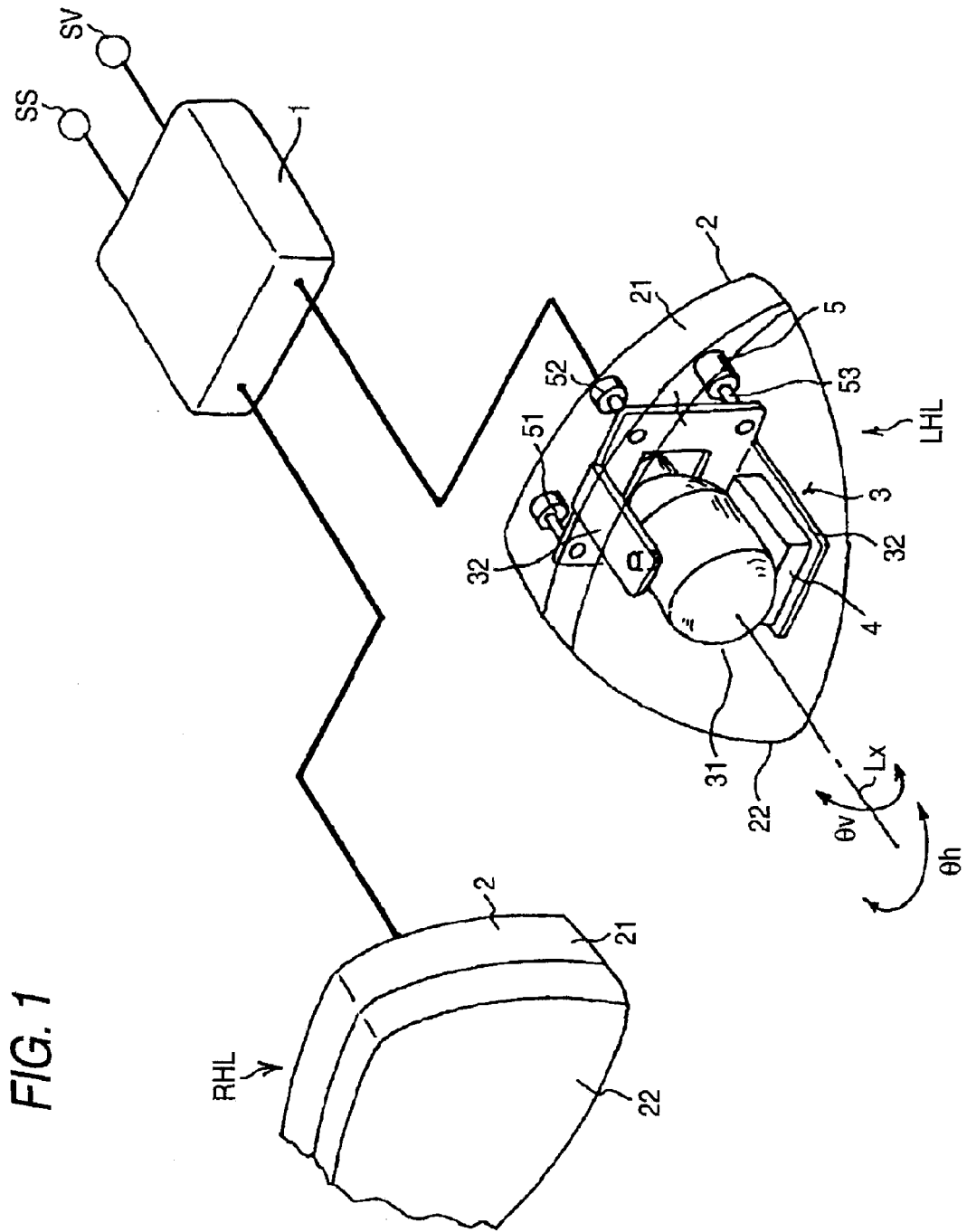
FIG. 1 is a conceptual view showing the entire configuration of an example embodiment of the invention.

A first example embodiment of the invention will be described below. FIG. 1 is a conceptual view showing the entire configuration of the first embodiment where the invention is applied to the left and right head lamps of a vehicle. The left and right headlamps LHL and RHL have a symmetrical structure, and the inner structure of the left headlamp LHL is schematically shown in FIG. 1. A lamp housing 2 of the left headlamp LHL includes a lamp body 21 and a transparent cover 22 that is provided on the front of the lamp body 21, and a lamp unit 3 is built in the lamp housing 2. Deflection of a lamp optical axis Lx of the lamp unit 3 can be controlled in horizontal and vertical directions by a swivel actuator 4 and a leveling actuator 5. In this case, the lamp unit 3 is supported by a bracket 32 so that a light-concentrating lamp 31 can be turned to the left and right. The turn position of the lamp unit 3 in the horizontal direction is changed by the swivel actuator 4, so that the lamp optical axis Lx is deflected within a given horizontal angle range θh. Thus, an irradiation range is changed. Although not shown in FIG. 1, the swivel actuator 4 uses a DC brushless motor (hereinafter, simply referred to as a "motor"), which is driven by an in-vehicle power source, as a rotary drive source. Further, the swivel actuator 4 is provided with a turning angle sensor, and thus detects and outputs the turning angle of the swivel actuator 4, that is, a swivel deflection angle when the swivel control of the lamp unit 3 is actually performed.

Meanwhile, the bracket 32 is supported by two aiming screws 51 and 52 and a movable rod 53 of a leveling actuator 5 so as to be tilted with respect to the lamp body 21 in the vertical direction. As the bracket 32 is tilted, the lamp optical axis Lx of the light-concentrating lamp 31 is deflected within a given vertical angle range θv so that an irradiation range is changed.

Each of the swivel actuators 4 of the left and right headlamps RHL and LHL is connected to an ECU (Electronic Control Unit) 1 that controls the deflection of a lamp. Accordingly, the horizontal deflection of the headlamp is controlled by the ECU 1. A steering angle sensor SS that detects a steering angle of a steering wheel STW and a vehicle speed sensor SV that detects the vehicle speed of the vehicle are connected to the ECU 1. As described below, the ECU 1 controls the swivel actuator 4 based on a steering angle signal output from the steering angle sensor SS and a vehicle speed signal output from the vehicle speed sensor SV. The ECU controls the irradiation direction of the lamp unit 3 by controlling the deflection of the lamp unit 3.

Figure 2:
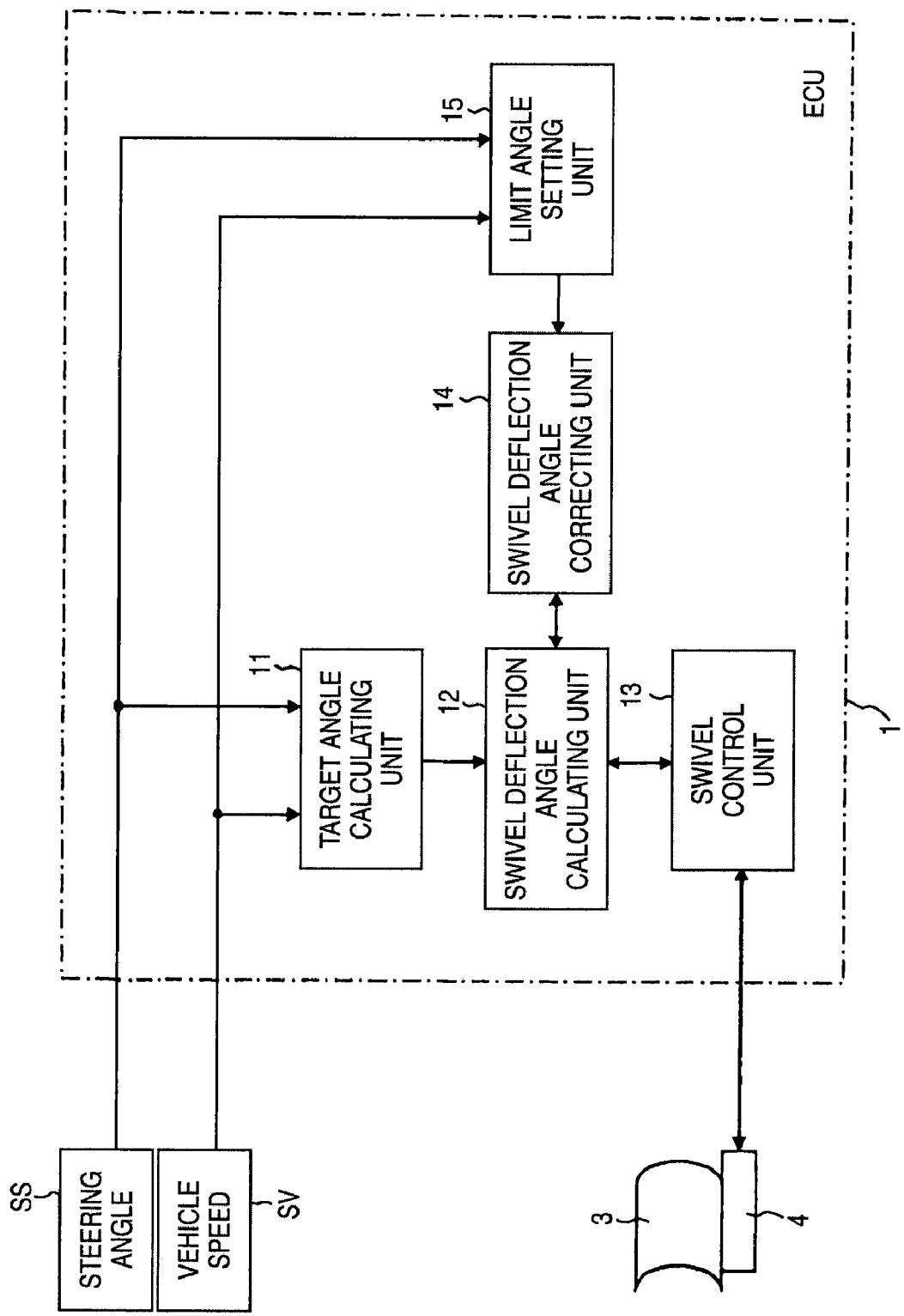
FIG. 2 is a block diagram of the example embodiment.

FIG. 2 is a block diagram. The ECU 1 includes a target angle calculating unit 11, a swivel deflection angle calculating unit 12, and a swivel control unit 13. The target angle calculating unit 11 calculates a horizontal irradiation angle of the optical axis Lx of the lamp unit 3 with respect to the steering angle of the vehicle on the basis of the steering angle signal output from the steering angle sensor SS and the vehicle speed signal output from the vehicle speed sensor SV, and sets a swivel target angle. The swivel deflection angle calculating unit 12 calculates a difference angle between the swivel target angle that is set by the target angle calculating unit 11 and an actual swivel deflection angle that is output from the swivel actuator 4, and calculates a swivel deflection angle on the basis of the difference angle. The swivel control unit 13 controls the deflection of the swivel actuator 4 on the basis of the calculated swivel deflection angle so that the swivel deflection angle follows the swivel target angle. Further, the ECU includes a swivel deflection angle correcting unit 14 and a limit angle setting unit 15. The swivel deflection angle correcting unit 14 compares the difference angle, which is acquired by the swivel deflection angle calculating unit 12, with a preset limit angle. If the difference angle is larger than the limit angle, the swivel deflection angle correcting unit 14 corrects the swivel deflection angle by the limit angle. The limit angle setting unit 15 sets the limit angle of the swivel deflection angle correcting unit 14. The limit angle setting unit 15 can change the limit angle. For this purpose, the output of each of the steering angle sensor SS and the vehicle speed sensor SV is also input to the limit angle setting unit 15.

Figure 3:
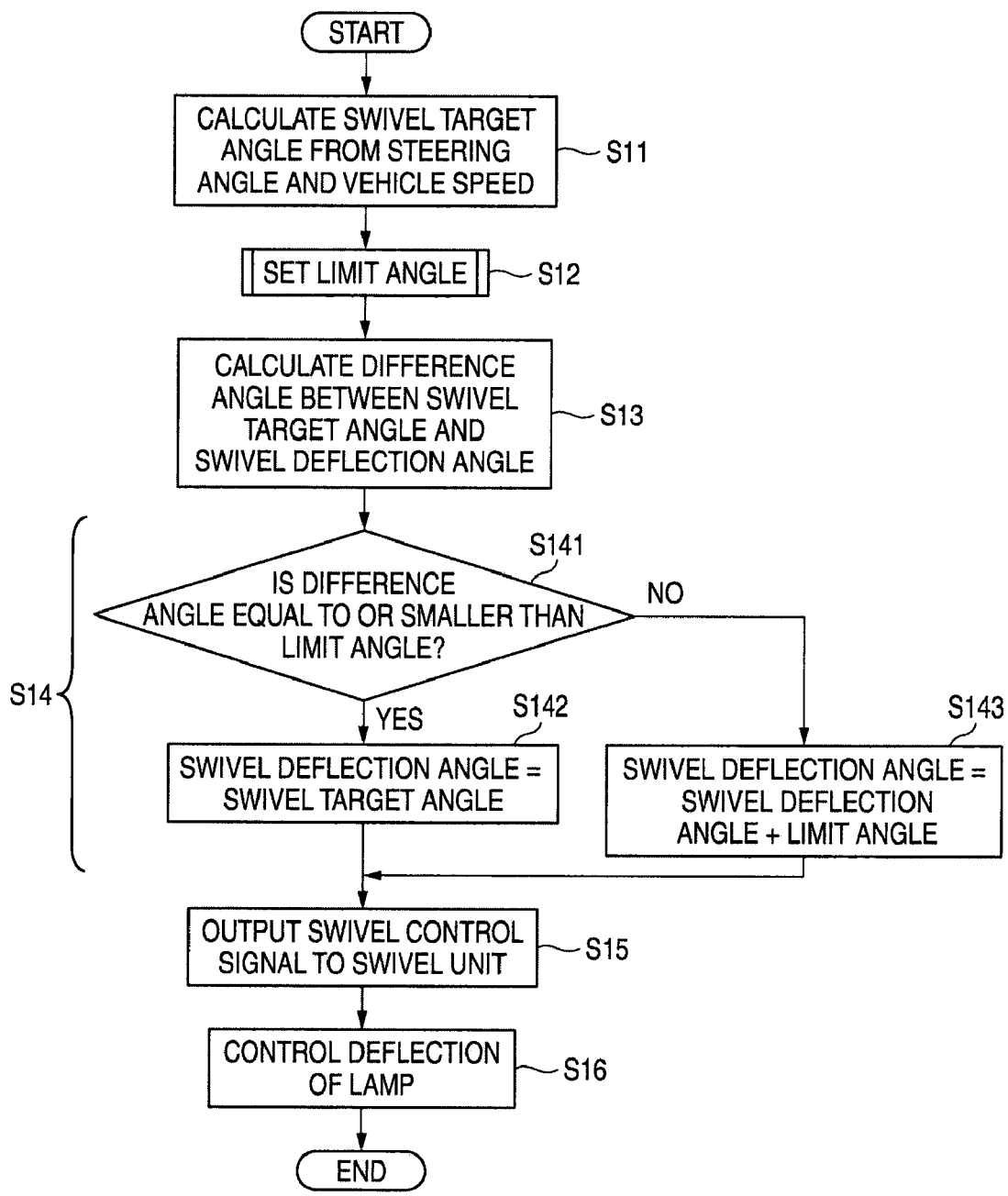
FIG. 3 is a main flowchart of the example embodiment.
Figure 4A:
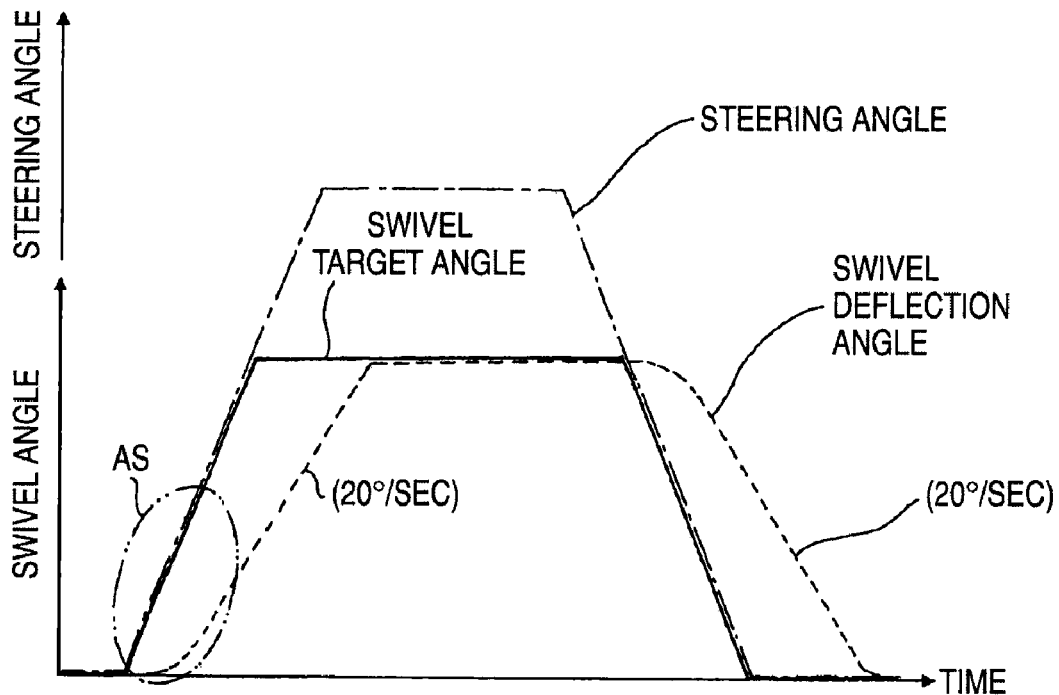
FIGS. 4A and 4B are timing diagrams showing a swivel target angle and a swivel deflection angle of a first embodiment.

The AFS control of the irradiation direction control device having the aforementioned structure (i.e., the deflection control of the irradiation direction of the lamp unit) is now described. FIG. 3 is a main flowchart of deflection control, and FIG. 4A is a timing diagram of the deflection control. In FIG. 4A, the horizontal axis represents time, and the vertical axis represents a steering angle and a swivel deflection angle of the lamp unit 3. In FIG. 3, the ECU 1 receives the steering angle signal output from the steering angle sensor SS and the vehicle speed signal output from the vehicle speed sensor SV, and calculates a swivel target angle by performing predetermined calculation in the target angle calculating unit 11 (Step S11). For example, when a steering angle is changed such that the vehicle travels from the straight ahead direction to the cornering direction as shown by a dashed-dotted line in FIG. 4A, the swivel target angle is calculated so that the swivel deflection angle of the lamp unit 3 (i.e., the deflection angle of the lamp optical axis Lx with respect to the straight ahead direction) is linearly increased in a right or left steering direction in response to the steering angle as shown by the thick solid line in FIG. 4A, and becomes maximum at a given swivel angle. Further, when steering operation is performed such that a steering angle returns to the straight ahead direction from the cornering direction, the swivel target angle is calculated so as to be linearly decreased from the maximum angle toward an angle of 0° that corresponds to the straight ahead direction.

Figure 9:
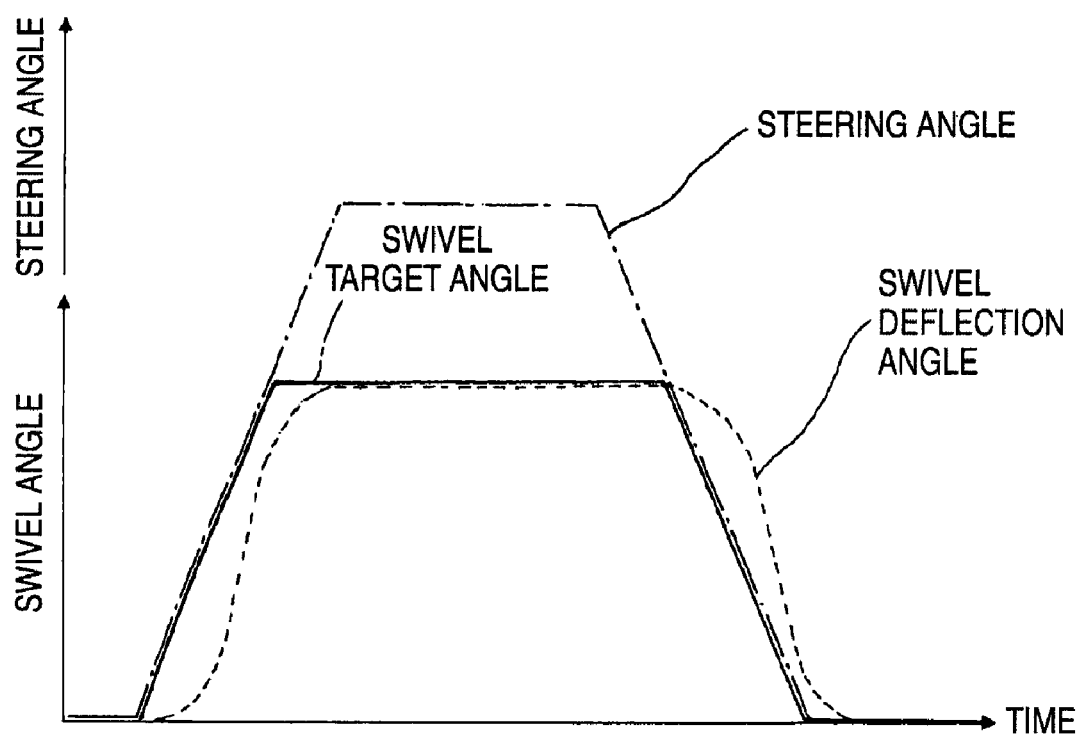
FIG. 9 is a timing diagram of a swivel target angle and a swivel deflection angle in the related art.

Next, the swivel deflection angle calculating unit 12 of the ECU 1 sets a limit angle (Step S12). According to the first embodiment, in the limit angle setting step S12, the limit angle set in the limit angle setting unit 15 is fixed to a given limit angle (e.g., the limit angle is fixed to 1°) as described below. Then, a difference angle between the current swivel deflection angle of the lamp unit 3 that is provided from the swivel actuator 4 and the swivel target angle that is obtained in the target angle calculating unit 11 is calculated (Step S13). The difference angle is an absolute value. Subsequently, a swivel deflection angle is calculated on the basis of the obtained difference angle as described in detail below (Step S14), and the calculated swivel deflection angle is provided to the swivel control unit 13 (Step S15). Further, the swivel control unit 13 controls the swivel actuator 4 on the basis of the input swivel deflection angle, and controls the optical axis Lx of the lamp unit 3 so that the optical axis Lx corresponds to the calculated swivel deflection angle (Step S16). In this case, if the swivel deflection angle is calculated so that the difference angle is decreased and the swivel actuator 4 is controlled during the calculation of the swivel deflection angle calculating unit 12, the defection control is performed so that the swivel deflection angle of the lamp unit 3 corresponds to the swivel target angle shown by a thick solid line in FIG. 4A. The swivel deflection angle has the characteristic shown by a thick broken line in FIG. 9, due to the characteristic of the DC brushless motor that drives the swivel actuator 4. In particular, the inclination of the swivel deflection angle may become 60°/sec to the maximum extent during the high-speed rotation. For this reason, as described above, there has been a problem in the related art in that the stability of the control of the swivel deflection deteriorates.

In the first embodiment, as shown in FIG. 3, the swivel deflection angle correcting unit 14 compares the difference angle, which is calculated in Step S13, with the limit angle in the swivel deflection angle calculating step S14 of the swivel deflection angle calculating unit 12 (Step S141). If the difference angle is equal to or smaller than the limit angle, a swivel target angle is output to the swivel control unit 13 as a new swivel deflection angle so that the difference angle is decreased to be equal to the limit angle (Step S142). Meanwhile, if the difference angle is larger than the limit angle, an angle obtained by adding the limit angle to the current swivel deflection angle is corrected to a new swivel deflection angle and is output to the swivel control unit 13 (Step S143). Accordingly, in the swivel deflection angle calculating unit 12, a swivel target angle is used as a swivel deflection angle if the difference angle is equal to or smaller than the limit angle, and swivel control is performed by the swivel control unit 13 on the basis of the swivel deflection angle. Further, if the difference angle is larger than the limit angle, swivel control is performed at the swivel deflection angle that is obtained by adding the limit angle to the current swivel deflection angle. Accordingly, even though the difference angle is large, the increment of the swivel deflection angle is limited to the limit angle, so that the deflection control, which uses a swivel target angle as a swivel deflection angle, is not performed.

Therefore, since the swivel deflection angle approaches the swivel target angle when the difference angle between the swivel target angle and the current swivel deflection angle is smaller than the limit angle, it is possible to control the swivel deflection angle even though the motor is not controlled at a high rotational speed. Meanwhile, when the difference angle is larger than the limit angle, as shown by the broken line in FIG. 4A, the increment of the swivel deflection angle is limited to an angle of which the upper limit is limited to the limit angle. Accordingly, deflection control, in which the motor is unnecessarily driven at a high speed, is prevented, and the irradiation direction of the lamp unit 3 is moved at a substantially constant speed so as to have the change smaller than the change of the swivel target angle. For example, there is a characteristic where the swivel deflection angle is increased at 20°/sec. Further, since the rotational speed of the motor is suppressed, the braking time is shortened when a deflection angle reaches a swivel target angle, so that characteristic linearity can be maintained. Therefore, it is possible to achieve the stable control of the irradiation direction of the lamp unit 3 where the speed of the swivel deflection control is substantially constant, and also to prevent a driver from feeling a sense of incongruity.

Figure 4B:
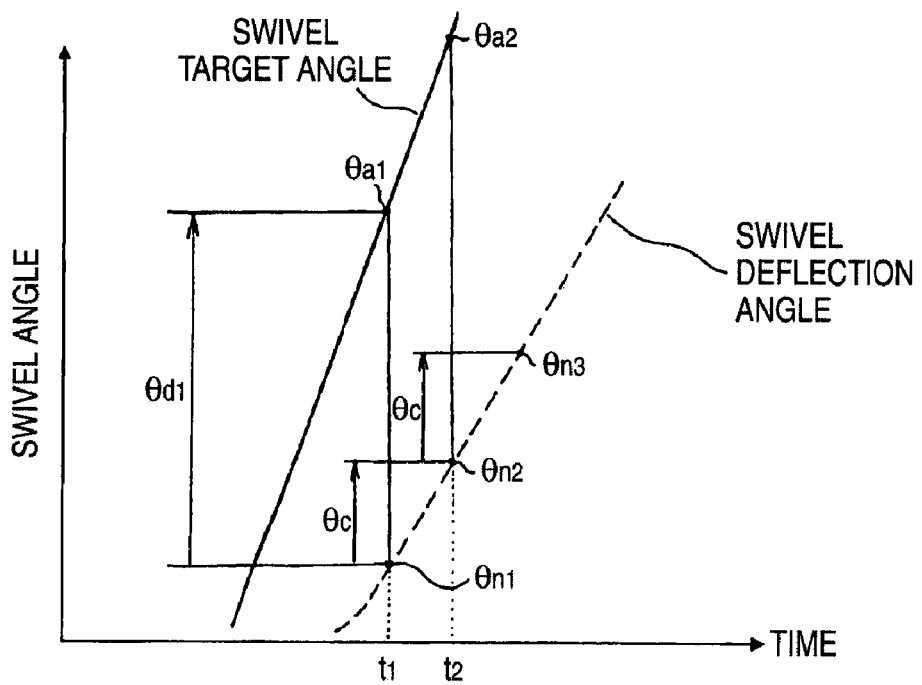

The calculation of the swivel deflection angle of Step S14 is described using a specific example. FIG. 4B is an enlarged view of a partial area as shown in FIG. 4A. Assuming that the current swivel deflection angle at a time t1 is denoted by $\theta n1$ and a swivel target angle at the time t1 is denoted by $\theta a1$, a difference angle $\theta d1$ is obtained from "$\theta d1 = \theta a1 - \theta n1$". Then, the difference angle $\theta d1$ and a limit angle $\theta c$ are compared with each other. If the difference angle $\theta d1$ is equal to or smaller than the limit angle $\theta c$, a swivel deflection angle to be controlled is referred to as the swivel target angle $\theta a1$. The limit angle $\theta c$ is, for example, 1°. However, since the difference angle $\theta d1$ is larger than the limit angle $\theta c$ in the example shown in FIG. 4B, a swivel deflection angle $\theta n2$ to be controlled is an angle $\theta n1 + \theta c$ that is obtained by adding the limit angle $\theta c$ to the current swivel angle $\theta n1$ and is smaller than the swivel target angle $\theta a1$. That is, even though the difference angle is larger than 1°, the swivel deflection angle to be controlled is limited to an angle that is obtained by increasing the current swivel deflection angle by 1°. Next, when a difference angle between the controlled swivel deflection angle $\theta n2$ and a swivel target angle $\theta a2$ is compared with the limit angle $\theta c$ at a time t2, the difference angle is larger than the limit angle $\theta c$. Accordingly, a swivel deflection angle $\theta n3$ to be controlled is an angle $\theta n2 + \theta c$, as described above. It may be possible to obtain the characteristic of the swivel deflection angle shown in FIG. 4A by repeating this operation.

A situation in which the steering angle is steered in the cornering direction (i.e., the optical axis Lx of the lamp unit 3 is deflected in the cornering direction) has been described above. A situation in which the lamp unit deflected in the cornering direction returns to the straight ahead direction occurs in the same manner. FIG. 4A shows the characteristic of the swivel deflection angle when the lamp unit 3 returns to the straight ahead direction. When the lamp unit 3 returns to the straight ahead direction, the swivel target angle is smaller than the swivel deflection angle. Accordingly, when the swivel deflection angle is corrected, a value, which is obtained by subtracting the limit angle from the swivel deflection angle, is corrected as a swivel deflection angle. Therefore, even when the lamp unit 3 returns to the straight ahead direction, the deflection control of the lamp unit 3 is performed at a substantially constant speed where the rotational speed is limited. As a result, the rapid change of the movement of the irradiation direction is suppressed, so that it may be possible to prevent a driver from feeling a sense of uneasiness.

Second Embodiment

In the first embodiment, the limit angle of the swivel deflection angle calculating unit 12 is fixed to a preset $\theta c$ (=1°). Accordingly, the control characteristic of the swivel deflection angle when a steering angle is steered in the cornering direction as shown in FIG. 4A, and the control characteristic of the swivel deflection angle when a steering angle returns to the straight ahead direction have the same speed, that is, the same inclination characteristic shown in FIG. 4A. When driving, a driver generally decreases vehicle speed when steering a vehicle to the left and right at the entrance of a curved road; by contrast, a driver generally increases vehicle speed when returning the steering angle to the straight ahead direction at the exit of a curved road. Accordingly, it is advantageous to relax the upper limit of the rotational speed of a motor and return quickly the irradiation direction when the steering returns to the straight ahead direction. For this reason, the limit angle, which is set by the limit angle setting unit 15, is configured to be variable in the second embodiment.

Figure 5A:
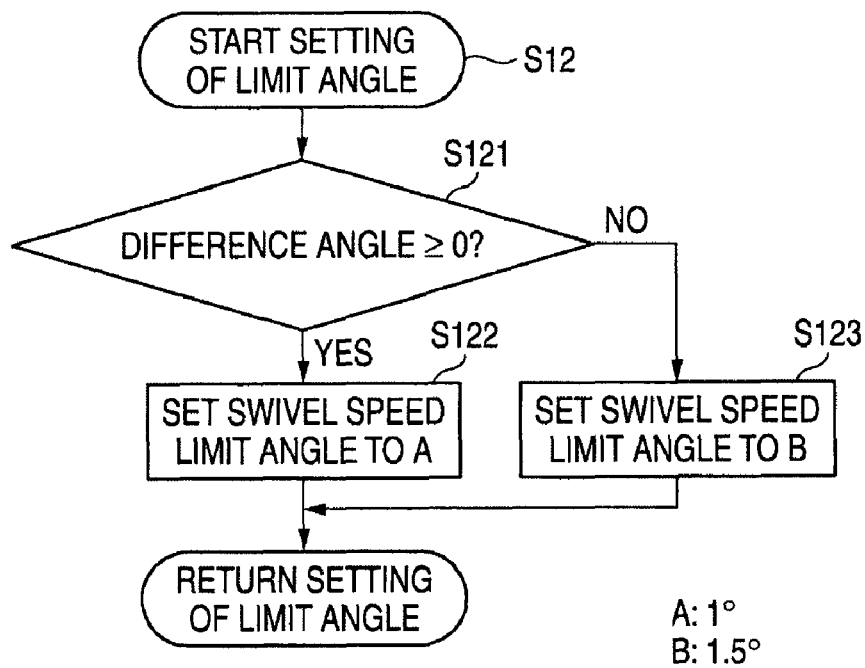
FIGS. 5A and 5B are flowcharts of a subroutine of second and third embodiments.

FIG. 5A is a flowchart of a subroutine of the limit angle setting step S12 of the main flowchart shown in FIG. 3. The limit angle setting unit 15 receives the difference angle that is provided to the swivel deflection angle correcting unit 14, for example, the difference angle $\theta d1$ in the case of FIG. 4B, and determines whether the difference angle $\theta d1$ is equal to or larger than 0 (Step S121). If the difference angle $\theta d1$ is equal to or larger than 0, the limit angle setting unit 15 sets a limit angle, which is to be set in the limit angle setting unit 15, to A (=1°) (Step S122). If the difference angle is smaller than 0, that is, the difference angle has a negative value, the limit angle setting unit 15 sets a limit angle, which is to be set, to B (=1.5°) (Step S123). That is, due to the delay of the control of the motor, the swivel deflection angle is smaller than or equal to a swivel target angle in a steering direction. Accordingly, the difference angle $\theta d1$ is equal to or larger than 0, and the limit angle is 1° in this case. In contrast, when steering operation is performed such that the vehicle returns to the straight ahead direction, the swivel deflection angle is larger than the swivel target angle in the steering direction. Accordingly, the difference angle $\theta d1$ has a negative value, and the limit angle is 1.5° in this case.

Figure 6:
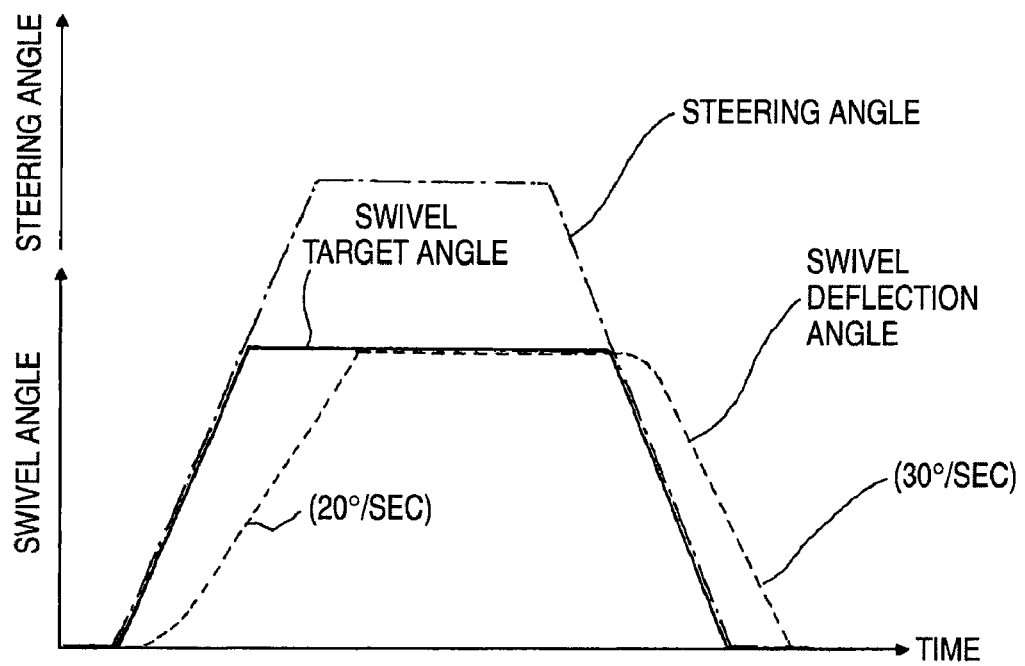
FIG. 6 is a timing diagram showing a swivel target angle and a swivel deflection angle of the second and third embodiments.

If the limit angle when steering operation is performed such that the vehicle returns to the straight ahead direction is set to be larger than the limit angle when steering operation is performed such that the vehicle travels in the cornering direction, as shown in FIG. 6, the swivel deflection angle is increased every 1° of the limit angle when steering operation is performed such that the vehicle travels in the cornering direction; by contrast, the swivel deflection angle is decreased every 1.5° of the limit angle when steering operation is performed such that the vehicle travels toward the straight ahead direction. Accordingly, when the inclination of both swivel deflection angles are compared with each other, the inclination a2 when steering operation is performed such that the vehicle travels toward the straight ahead direction is larger than the inclination a1 when steering operation is performed such that the vehicle travels in the cornering direction. When steering operation is performed such that the vehicle travels toward the straight ahead direction, the limitation of the rotational speed of the motor is relaxed and the swivel deflection control can be performed at a high speed as compared to when steering operation is performed such that the vehicle travels in the cornering direction. For example, when steering operation is performed such that the vehicle travels toward the cornering direction, the inclination is 20°/sec. However, when steering operation is performed such that the vehicle travels in the straight ahead direction, the inclination is 30°/sec. Accordingly, the responsiveness of the swivel deflection control with respect to the change in a steering angle is high at the exit of a curved road, so that irradiation can be performed more quickly in the traveling direction. However, even in this case, the change of the swivel deflection angle is limited by the limit angle. Accordingly, the swivel deflection control is performed at a substantially constant speed, which is the same as the first embodiment.

Third Embodiment

Figure 5B:
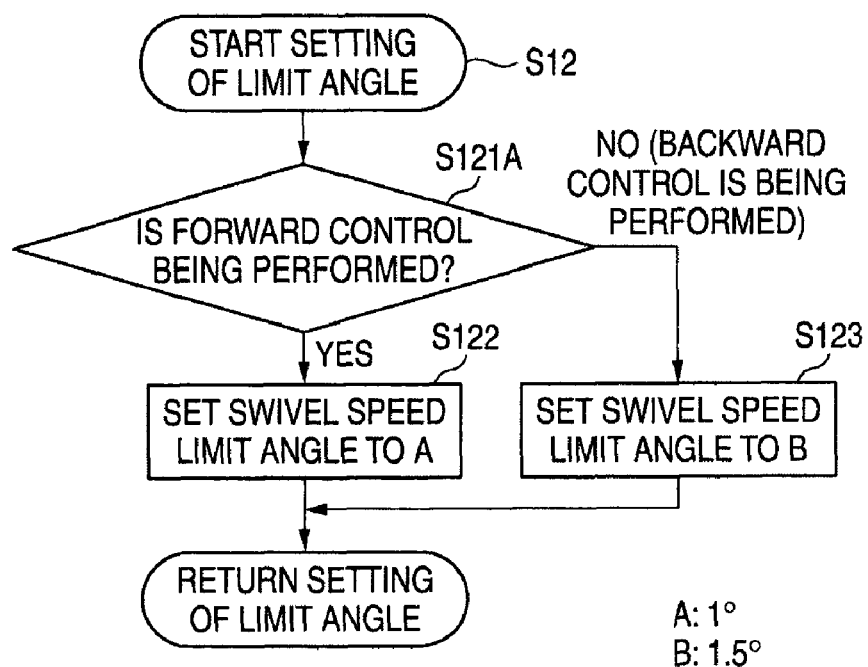

In a third embodiment, as in the second embodiment, the limit angle when steering operation is performed such that the vehicle travels toward the cornering direction is different from the limit angle when the steering operation is performed such that the vehicle travels toward the straight ahead direction. However, an operation for setting the limit angle of the limit angle setting unit 15 in the third embodiment is different from that in the second embodiment. As shown in FIG. 2, a steering angle signal output from the steering angle sensor SS is input to the limit angle setting unit 15. FIG. 5B is a flowchart of another subroutine of the limit angle setting step S12 of the main flowchart shown in FIG. 3. The limit angle setting unit 15 determines which of the cornering direction or the straight ahead direction steering is performed, by determining the change of the steering angle with the lapse of time (Step S121A). If the absolute value of the steering angle is being increased, steering operation is being performed such that the vehicle travels towards the cornering direction. Accordingly, this is referred to as forward control, and the limit angle set in the limit angle setting unit 15 is set to A (=1°) (Step S122). In contrast, if the steering angle is being decreased, steering operation is being performed such that the vehicle travels in the straight ahead direction. Accordingly, this is referred to as backward control, and the limit angle is switched to B (=1.5°) (Step S123).

If the limit angle when steering operation is performed such that the vehicle travels toward the straight ahead direction is set to be larger than the limit angle when steering operation is performed such that the vehicle travels toward the cornering direction, as shown in FIG. 6, the swivel deflection angle is increased every 1° of the limit angle when steering operation is performed such that the vehicle travels toward the cornering direction; by contrast, the swivel deflection angle is decreased every 1.5° of the limit angle when steering operation is performed such that the vehicle travels toward the straight ahead direction. Accordingly, when steering operation is performed such that the vehicle travels toward the straight ahead direction, the limitation of the rotational speed of the motor is relaxed and the swivel deflection control may be performed at a high speed as compared to when steering operation is performed such that the vehicle travels toward the cornering direction. Accordingly, the responsiveness of the swivel deflection control with respect to the change in a steering angle is high at the exit of a curved road, so that irradiation can be more quickly performed in the traveling direction. Even in this case, the change of the swivel deflection angle is limited to a limit angle of 1.5°. Accordingly, the swivel deflection control is performed at a substantially constant speed.

Fourth Embodiment

In the first embodiment, when the speed of the swivel deflection control is changed, the limit angle is fixed to 1°. In the second and third embodiments, the limit angle is switched to 1° and 1.5° in accordance with the steering direction. However, even when the vehicle speed is changed, the limit angle is fixed to a specific value in all the embodiments. Accordingly, the swivel deflection control is limited by the set limit angle. In actual driving of a vehicle, higher-speed swivel deflection control is often required for the steering if the vehicle speed becomes high. In this case, the target angle calculating unit 11 sets the swivel target angle to different characteristics in accordance with the vehicle speed. However, since the limit angle is fixed in the first to third embodiments, the swivel deflection angle has a constant change characteristic regardless of the difference in vehicle speed. For this reason, it is difficult to cope with the change in vehicle speed. Accordingly, in the fourth embodiment, when the swivel target angle is set to be changed in accordance with the vehicle speed, the limit angle is set to be switched in accordance with this.

Figure 7A:
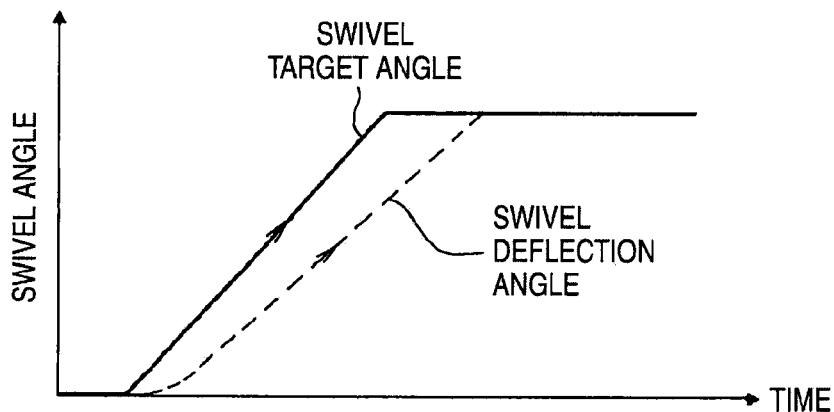
FIGS. 7A to 7C show timing diagrams of swivel target angles and swivel deflection angles of a fourth embodiment that correspond to a low speed, a medium speed, and a high speed, respectively.
Figure 7B:
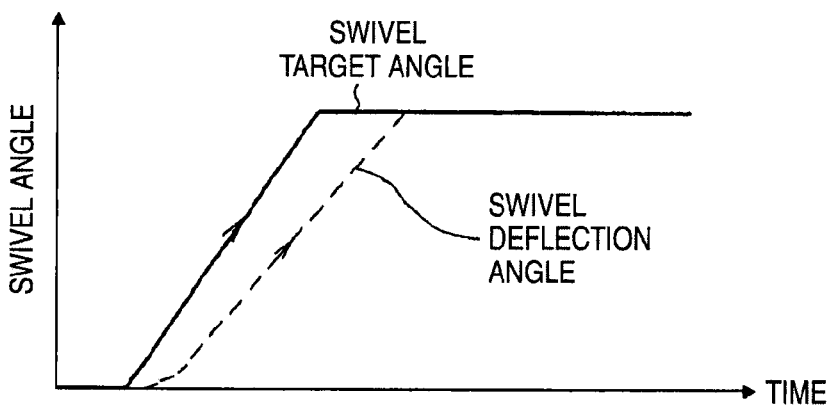
Figure 7C:
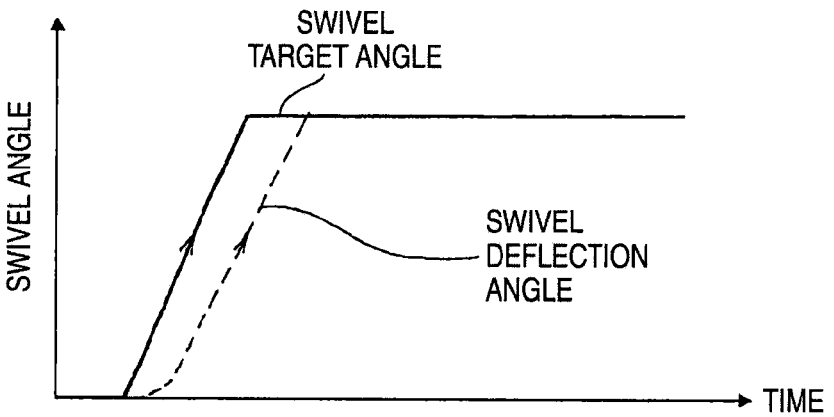
Figure 8:
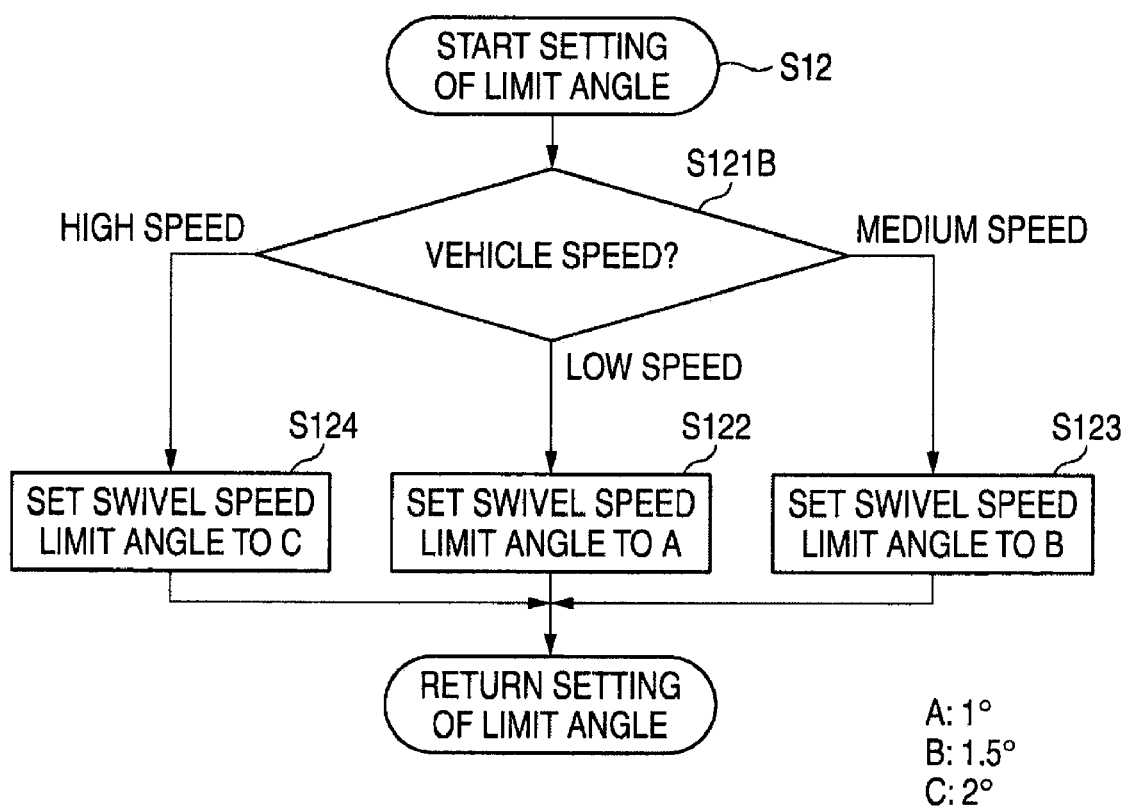
FIG. 8 is a flowchart of a subroutine of the fourth embodiment.

The target angle calculating unit 11 shown in FIG. 2 sets swivel target angles that have different characteristics in accordance with the vehicle speed. In this example, the vehicle speed is divided into three ranges of "low speed (20 km/h or less)," "medium speed (20 to 50 km/h)," and "high speed (50 km/h or more)," and a swivel target angle corresponding to each range of the vehicle speed is set. FIGS. 7A, 7B, and 7C show respective characteristics of the swivel target angle and the swivel deflection angle at "low speed," "medium speed," and "high speed." However, FIGS. 7A, 7B, and 7C show the characteristic only when steering operation is performed such that the vehicle travels toward the cornering direction, and does not show the case where the steering operation is performed such that the vehicle travels toward the straight ahead direction. As shown by a thick solid line in FIGS. 7A, 7B, and 7C, the inclination of the swivel target angle is set to be large as the vehicle speed becomes high. Meanwhile, as shown in FIG. 2, a vehicle speed signal output from the steering angle sensor SS is input to the limit angle setting unit 15. The limit angle setting unit 15 sets a limit angle to a different angle for each of "low speed," "medium speed," and "high speed," on the basis of the input vehicle speed. FIG. 8 is a flowchart of a subroutine of the limit angle setting step S12 of the main flowchart shown in FIG. 3. The limit angle setting unit 15 determines the input vehicle speed (Step S121B). If the input vehicle speed is "low speed," the limit angle setting unit sets a limit angle to A (=1°) (Step S122). If the input vehicle speed is "medium speed," the limit angle setting unit sets a limit angle to B (=1.5°) (Step S123). If the input vehicle speed is "high speed," the limit angle setting unit sets a limit angle to C (=2°) (Step S124).

In the fourth embodiment, in FIG. 7A, if the vehicle speed is "low speed," the swivel target angle is gradually increased and the limit angle setting unit 15 sets a limit angle to 1°. Accordingly, the swivel deflection angle is increased at a limit angle of 1°. Since the inclination of the swivel target angle at a "low speed" is small, appropriate swivel deflection control of the swivel deflection angle is performed even though a limit angle is 1°. In FIG. 7B, if the vehicle speed is "medium speed," an increase rate of the swivel target angle is slightly increased, but the limit angle set in the limit angle setting unit 15 is switched to 1.5°. Accordingly, the swivel deflection angle is also increased at a limit angle of 1.5°, so that it may be possible to perform the swivel deflection control following the swivel target angle at a "medium speed." In FIG. 7C, if the vehicle speed is "high speed," an increase rate of the swivel target angle is increased but the limit angle set in the limit angle setting unit 15 is 2°. Accordingly, the swivel deflection angle is increased at a limit angle of 2°, so that it may be possible to perform the swivel deflection control following the swivel target angle at a "high speed." Since a limit angle of the swivel deflection control is set even in any case of "low speed," "medium speed," and "high speed" as described above, the swivel deflection control is performed at respective speeds that are different from each other but are substantially constant. Therefore, a driver does not feel a sense of uneasiness.

In the first to fourth embodiments, the limit angle is a constant angle or an angle selected from a plurality of angles. However, a method, which includes detecting the inclination of the swivel target angle in the early stage of the swivel control and setting a limit angle to a different angle on the basis of the detected inclination, can be used as a method of setting a limit angle. It is possible to calculate the inclination of the swivel target angle from a target angle that is calculated by the target angle calculating unit 11. In particular, when the characteristic of the swivel target angle is changed by the difference in vehicle speed as described in the fourth embodiment, it is possible to detect the difference of the swivel target angle in the early stage of the control and to set a limit angle corresponding to the difference of the swivel target angle. Therefore, it is possible to obtain appropriate swivel deflection angles that follow respective swivel target angles having different characteristics, and to perform swivel control.

The present invention is not limited to the AFS that has been described above in the first to fourth embodiments. As long as an AFS controls the deflection of the irradiation direction of a lamp in response to the change in a steering angle, the AFS may be applied likewise.

While the present invention has been shown and described with reference to certain embodiments thereof, other implementations are within the scope of the claims. It will be understood by those skilled in the art that various changes in form and details may be made therein without departing from the spirit and scope of the invention as defined by the appended claims.

What is claimed is:

1. A device that detects a steering angle of a vehicle and controls a deflection of an irradiation direction of a vehicle lamp based on the detected steering angle, the device comprising:
    a target angle calculating unit that calculates a target angle of the irradiation direction of the vehicle lamp based on the steering angle;
    a deflection angle calculating unit that calculates a difference angle between the target angle and a current deflection angle, and then calculates a deflection angle of the irradiation direction of the vehicle lamp based on the difference angle;
    a deflection angle correcting unit that corrects the calculated deflection angle based on a limit angle;
    a limit angle setting unit that sets the limit angle and outputs the limit angle to the deflection angle correcting unit; and
    a control unit that controls the deflection of the irradiation direction of the vehicle lamp, based on the calculated deflection angle or the corrected deflection angle,
    wherein when the difference angle is larger than the limit angle, the deflection angle correcting unit corrects the calculated deflection angle by adding or subtracting the limit angle to or from the current deflection angle.

2. The device according to claim 1, wherein the limit angle setting unit sets the limit angle such that the limit angle when the difference angle has a negative value is larger than the limit angle when the difference angle has a positive value.

3. The device according to claim 1, wherein the limit angle setting unit sets the limit angle such that the limit angle when the steering angle is increased in a cornering direction is smaller than the limit angle when the steering angle is decreased in a straight ahead direction.

4. The device according to claim 1, wherein the target angle calculating unit calculates a target angle of the irradiation direction of the vehicle lamp based on a detected vehicle speed in addition to the detected steering angle.

5. The device according to claim 1, wherein the limit angle setting unit sets the limit angle such that:
    (i) the limit angle equals a first angle when a detected vehicle speed is in a first range of speed;
    (ii) the limit angle equals a second angle when the detected vehicle speed is in a second range of speed; and
    (iii) the limit angle equals a third angle when the detected vehicle speed is in a third range of speed.

6. The device according to claim 5, wherein the first angle is less than the second angle, and the second angle is less than the third angle.

7. The device according to claim 5, wherein the first range of speed is less than the second range of speed, and the second range of speed is less than the third range of speed.

8. A method of detecting a steering angle of a vehicle and controlling a deflection of an irradiation direction of a vehicle lamp based on the detected steering angle, the method comprising:
    (a) calculating a target angle of the irradiation direction of the vehicle lamp, based on the steering angle;
    (b) calculating a difference angle between the target angle and a current deflection angle of the irradiation direction of the vehicle lamp;
    (c) calculating a new deflection angle, wherein calculating the new deflection angle comprises:
        (i) setting the new deflection angle to the target angle if the difference angle is equal to or smaller than a given limit angle;
        (ii) setting the new deflection angle to an angle obtained by adding or subtracting the limit angle to or from the current deflection angle, if the difference angle is larger than the given limit angle; and
    (d) controlling deflection of the irradiation direction of the lamp based on the deflection angle.

9. The method according to claim 8 further comprising (e) setting the limit angle to a fixed preset value.

10. The method according to claim 8 further comprising (e) calculating the limit angle, wherein calculating the limit angle comprises:
    (i) setting the limit angle to a first angle if the difference angle is equal to or larger than zero; and
    (ii) setting the limit angle to a second angle if the difference angle is smaller than zero.

11. The method according to claim 10 wherein the second angle is larger than the first angle.

12. The method according to claim 8 further comprising (e) calculating the limit angle, wherein calculating the limit angle comprises:
    (i) setting the limit angle to a first angle if an absolute value of the detected steering angle is being increased; and
    (ii) setting the limit angle to a second angle if an absolute value of the detected steering angle is being decreased.

13. The method according to claim 12, wherein the second angle is larger than the first angle.

14. The method according to claim 8 further comprising:
    (e) detecting the vehicle speed; and
    (f) calculating the limit angle, wherein calculating the limit angle comprises:
        (i) setting the limit angle to a first angle if the detected vehicle speed is in a first range of speed;
        (ii) setting the limit angle to a second angle if the detected vehicle speed is in a second range of speed; and
        (iii) setting the limit angle to a third angle if the detected vehicle speed is in a third range of speed.

15. The method according to claim 14 wherein the first range of speed is less than the second range of speed, and the second range of speed is less than the third range of speed.

16. The method according to claim 14 wherein the first angle is less than the second angle, and the second angle is less than the third angle.

* * * * *